US006700475B1

(12) United States Patent
Geber et al.

(10) Patent No.: US 6,700,475 B1
(45) Date of Patent: Mar. 2, 2004

(54) ELECTRONIC CLOSURE SYSTEM, IN PARTICULAR A VEHICLE CLOSURE SYSTEM

(75) Inventors: Michael Geber, Bad Urach (DE); Joern-Marten Ohle, Leonberg (DE); Andreas Pohlmann, Weil der Stadt (DE)

(73) Assignee: DaimlerChrysler, Stuttgart (DE)

(*) Notice: Subject to any disclaimer, the term of this patent is extended or adjusted under 35 U.S.C. 154(b) by 0 days.

(21) Appl. No.: 09/531,762

(22) Filed: Mar. 20, 2000

(30) Foreign Application Priority Data

Mar. 19, 1999 (DE) ........................................ 199 12 319

(51) Int. Cl.[7] ................................................ G05B 19/00

(52) U.S. Cl. ...................... 340/5.61; 340/5.7; 307/10.1; 455/343

(58) Field of Search ................................. 340/5.61, 5.7, 340/5.72, 825.49, 825.71, 825.72; 307/10.1, 10.5, 10.2; 455/343

(56) References Cited

U.S. PATENT DOCUMENTS 5,942,985 A * 8/1999 Chin ..................... 340/825.31
5,973,611 A * 10/1999 Kulha et al. ........... 340/825.31

FOREIGN PATENT DOCUMENTS

| | | | | |
|---|---|---|---|---|
| DE | 36 28 706 A1 | 8/1986 | | |
| DE | 42 26 053 A1 | 8/1992 | | |
| DE | 44 09 167 C1 | 3/1994 | | |
| DE | 195 42 441 C2 | 11/1995 | | |
| DE | 197 20 765 A1 | 5/1997 | | |
| DE | 197 38 323 C1 | 9/1997 | | |
| EP | 0 629 758 A1 | 12/1994 | | |
| EP | 0 682 166 A1 | 11/1995 | | |
| JP | 06-85878 | 12/1994 | | |
| JP | 09-170364 | 6/1997 | | |
| JP | 9-170364 A | * 6/1997 | ............ | H04Q/9/00 |
| JP | 09-317288 | 12/1997 | | |
| JP | 10-273984 | 10/1998 | | |

* cited by examiner

*Primary Examiner*—Michael Horabik
*Assistant Examiner*—M Shimizu
(74) *Attorney, Agent, or Firm*—Crowell & Moring LLP

(57) ABSTRACT

An electronic closure system has one or more lockable and unlockable closure units, each arranged on an opening element of an object to be secured, at least one authorizing authentication element and a closure control unit with at least one authentication element identification sensor. The at least one authentication element identification sensor has a predetermined detection area, which covers an external detection zone outside the object. The closure control unit produces different closure control commands, related to locking and/or unlocking, based on whether and in what external detection zone authorizing authentication element is detected. The closure control unit contains a sensor system for determining the range of an identified authentication element from the object and, on identification of an authorizing authentication element, automatically produces different closure control commands for the respective closure unit, as a function of the range between the identified authentication element and the object.

16 Claims, 1 Drawing Sheet

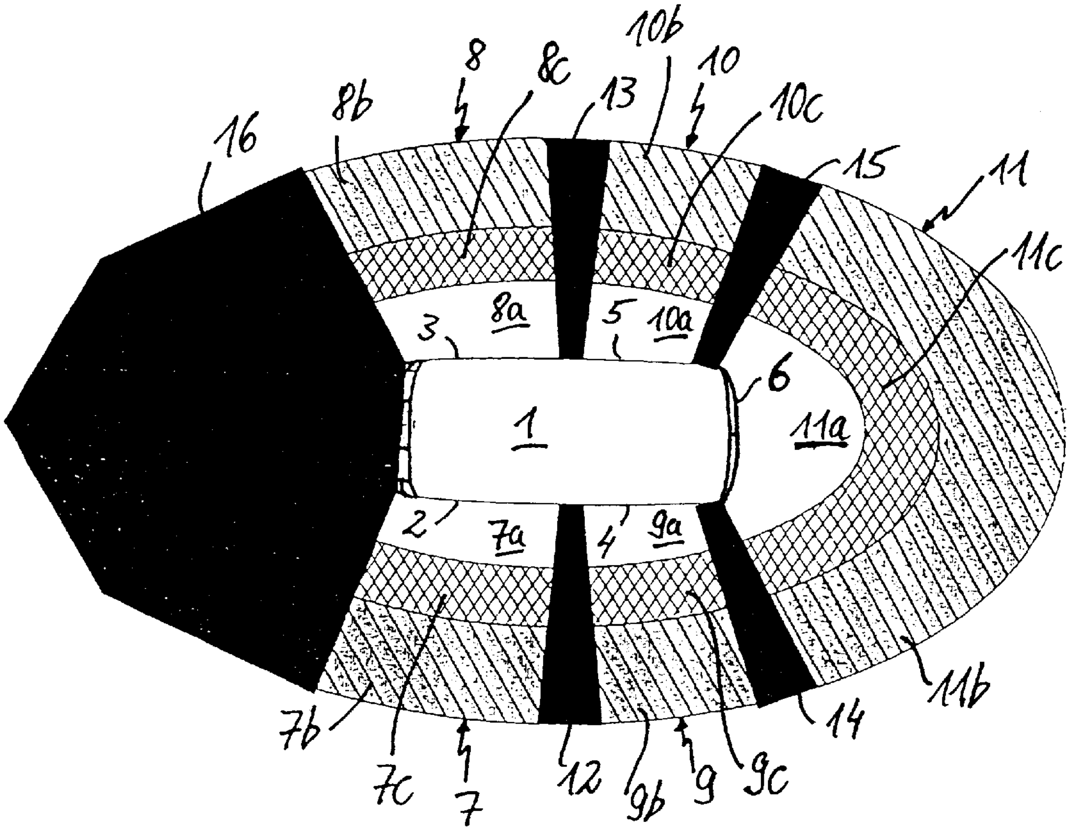
Fig.

ELECTRONIC CLOSURE SYSTEM, IN PARTICULAR A VEHICLE CLOSURE SYSTEM

BACKGROUND AND SUMMARY OF THE INVENTION

This application claims the priority of German patent document 199 123 19.5, filed Mar. 19, 1999, the disclosure of which is expressly incorporated by reference herein.

The invention relates to an electronic closure system used to secure access elements, such as doors and the like of vehicles and other objects. In systems of this type, a closure control means produces closure control commands concerning locking and unlocking of the respective closure unit based on whether it detects (via associated identification sensors) an authorizing authentication element situated within a detection area. The user does not perform any active authentication element operation; rather, he needs only to carry the authentication element with him, and to move it into the detection area of an identification sensor.

The authentication element comprises, for example, a smart card, and the detection process typically takes place by means of wireless communication between the closure control means and the authentication element. The communication process also includes a test to determine whether the authentication element is individually applicable to the relevant object. The detection area is frequently defined by the reception area of an antenna unit, via which the closure control means scans for the presence of, and communicates with, an authentication element. Such systems are in use, in particular as vehicle closure systems, and are also referred to as keyless-go systems.

In conventional keyless-go systems installed in modern vehicles, the enable and inhibit commands may be closure control commands produced by the closure control means, which enable or inhibit locking or unlocking of the closure unit. The vehicle doors and tailgate can be opened only in the unlocked closure state. Locking and unlocking themselves are carried out by actuating an operating element which is preferably arranged on the vehicle itself (for example in the form of a break contact and/or a closure button on the outside of the vehicle doors or of the tailgate). In this case, such actuation also initiates the communication process for authentication checking. The closure function required per se by the user from this operation is therefore delayed by the duration of the authentication process. The use of a proximity sensor for early identification of such a closure operating wish by the user, in good time, can reduce or entirely eliminate this delay, but at the expense of the complexity required to do so. A system of this type is described in the German Patent Document DE 198 39 355, which was not published prior to this.

German Patent Document DE 195 42 441 C2 discloses an antenna apparatus for an anti-theft system for a motor vehicle having various antenna units, one of which one may be arranged on each of the front vehicle doors and on a tailgate. An external part of the antenna reception area defines a detection area within which a transponder which is moved towards the vehicle (and acts as an authentication element) can be identified, and can be interrogated for authorization. On identification of an authorizing transponder, an enable signal is produced, for example to unlock the doors or to deactivate an electronic immobilizer.

Furthermore, it is known that, with electronic vehicle closure systems, particularly keyless-go systems, the distance between an authentication element carried by the user and the vehicle can be determined, if required, by a range sensor system. For example, in a vehicle closure system. For example, in a vehicle closure system described in German patent document DE 44 09 167 C1, this is done by means of a delay-time measurement using ultrasound or UHF signals.

European Patent Document EP 0 629 758 A1 discloses a system, which may, for example, be in the form of an electronic closure system, for remote control of units in a vehicle (such as door closure units), with an authentication element which can be carried by a user and via which the vehicle user can activate a respective actuation process. Once various signal strength thresholds have been preset, the system part in the vehicle is able to use the signal received from the authentication element, at a distance from the vehicle, to determine, during a communication process the range zone (out of a plurality of predeterminable range zones) in which the authentication element is located. Different, associated control functions are initiated depending on which of the range zones the authentication element is located in.

One object of the invention is to provide an electronic closure system of the type mentioned initially (that is, a keyless-go system) which reliably and/or flexibly allows a closure unit to be locked or unlocked, as desired, without any noticeable delay for the user.

Another object of the invention is to provide such an electronic closure system which has relatively few operating elements that need to be operated by the user.

These and other objects and advantages are achieved by the closure system according to the invention, in which the closure control means contains an authentication element range sensor system, which determines the range of an authentication element from an object to be secured, such as a vehicle, when the authentication element is located within the external detection zone of an identification sensor. It is apparent that the range sensor system may be combined with the identification sensors to form an authentication element detector unit. The closure control means produces different closure control commands determined in such a way as a function of the range of the authentication element from the object.

The closure system according to the invention allows the selection of closure control commands produced relatively differently, depending on the position of the authentication element within the respective external detection zone. By taking account of the range from the authentication element to the object in this way, the closure control commands can always be produced in good time, in such a manner that there is no reduction in user convenience due to detectable delay times when carrying out desired closure functions.

A particular advantage in this context is that the closure control means automatically produces the closure control command on identification of an authorizing authentication element, (and thus not just when some control element is operated by the user) In particular, closure control commands related to unlocking can be produced at an early stage as the user approaches the object, even before the user reaches the object and operates a control element to open an access element, such as a door or the like. The closure control commands may in this case just be enable and inhibit signals, depending on the system design, which merely enable or inhibit locking or unlocking of the respective closure unit (such locking or unlocking being initiated in some other way), or they may themselves form the locking and unlocking control signals which result in the relevant closure unit actually assuming its locked or unlocked state, respectively.

In one embodiment of the locking system according to the invention, the respective external detection zone of an identification sensor is split into at least one range zone relatively close to the object and one range zone relatively far away from the object. Between these two range zones, the range sensor system can distinguish (that is, it identifies) whether an authentication element identified in the external detection zone is located in the range zone relatively close to the object or in the range zone relatively far away from the object. The type of closure control command produced by the closure control means is then selected as a function of whether the authentication element is located in the range zone relatively close to the object or the range zone relatively far away from the object. Since the range determination process is thus reduced to the relatively simply task of confirming which of the two range zones of an external detection zone the authentication element is located in, a correspondingly simple range sensor system (which performs this determination without having to provide high-precision position determination) is sufficient.

The transitional area between the range zone relatively close to the object and the range zone relatively far away from the object forms a hysteresis area. That is, the closure control command which is produced changes at a greater range when moving from the range zone relatively close to the object to the range zone relatively far away from the object than, conversely, when moving from the range zone relatively far away from the object to the range zone relatively close to the object. This avoids the production of undefined closure control commands related to locking and unlocking when an authorizing authentication element is located in this transitional area.

Another embodiment of the invention has a plurality of closure units, each of which has an associated identification sensor. In this embodiment, it is possible to select the association between the closure units and the external detection zones which respectively influence them. Thus, for example, on identifying an authorizing authentication element in one of the external detection zones, a closure control command can be produced just for the closure unit associated with this external detection zone, or else for further closure units, for example all the other closure units. This improves the system flexibility and allows, for example, a combination of a central locking function with individual actuation of closure units.

In a further refinement of the invention, closure control commands related to unlocking are associated with the range zones relatively close to the object, and closure control commands related to locking are associated with the range zones relatively far away from the object. This has the effect that closure control commands which act in the unlocking sense are produced only when the user, carrying the authentication element with him, is located relatively close to the object, even though he is not necessarily sufficiently close to be in touching contact, while closure control commands related to locking and which act on the closure units in the sense of locking them are produced when the authentication element is at a somewhat greater range from the object. It is thus possible automatically to ensure that the object is accessible to the authorized user when he is located close to it and, on the other hand, that the closure units and thus the closure system overall assume their locked state, securing them against intrusion, when the authorized user is at a distance from the object.

In still another embodiment of the closure system according the invention, the closure control commands which are produced automatically by the closure control means do not just form enable or inhibit signals for enabling or inhibiting locking or unlocking of a closure unit. Rather, they themselves form the locking and unlocking commands which produce the locking and unlocking actions. This automatic locking and unlocking of the respective closure unit depending on the range of an identified authentication element from the object and, preferably and additionally, as a function of the present closure state of the closure system, eliminates the need for locking and/or unlocking elements which are operated by the user.

Finally, yet another embodiment of the invention, contains automatic relocking means, which ensures that a closure control command which acts in the locking sense is generated following production of a closure control command acting in the unlocking sense and the expiration of a predeterminable waiting time thereafter. The relevant closure unit is once again changed to a state which secures it against unlocking if the associated access element does not carry out any opening process during the waiting time and, after the waiting time has expired, no authorizing authentication element is any longer located in an area of the external detection zones associated with closure control commands relating to unlocking (that is, is no longer at an unlocking range).

Other objects, advantages and novel features of the present invention will become apparent from the following detailed description of the invention when considered in conjunction with the accompanying drawings.

BRIEF DESCRIPTION OF THE DRAWINGS

The single FIGURE shows a plan view of a motor vehicle with schematically illustrated external detection zones of authentication element identification sensors of an electronic vehicle closure system according to the invention.

DETAILED DESCRIPTION OF THE DRAWINGS

The FIGURE shows, schematically from above, a motor car 1 having a closure system designed as a keyless-go system. In a conventional manner the closure system contains a closure unit (not shown) for each of the four vehicle doors 2, 3, 4, 5 and for a tailgate 6. Similarly, the closure units have suitable conventional associated closure control means which produce the necessary closure control commands to switch the various closure units between a locked state, in which they inhibit the opening of the associated access element (that is, one of the doors 2 to 5 or the tailgate 6), and an unlocked state, in which they the access element to be opened when the user operates a corresponding opening control element, such as a door handle or a tailgate opening button. The vehicle user or users with access authorization carry an authentication element which is appropriately coded specifically for that vehicle, for example in the form of a smart card. The authorization of this authentication element for the particular vehicle is checked by an authentication process by means of wireless data communication between the closure control means in the vehicle and the authentication element (for example via a radio link using the 24 GHz frequency band.

According to the keyless-go operating principal, an authentication communication between the closure control means and an authentication element occurs without any further operation of the latter, when it is located within a predeterminable detection area of closure control means identification sensors provided for this purpose. (one such identification sensor is assigned to each closure unit in the example under consideration). The authentication element identification sensors are likewise of conventional construction and, typically, each contains an antenna unit arranged in the area of the associated closure unit, the reception area of which forms the detection area. The antenna unit emits an interrogation signal covering the detection area from the closure control means and, when an authentication element is identified, an authentication communication is carried out with this element.

Normally, the detection area of these identification sensors covers not only an internal detection zone within the vehicle interior, but also an external detection zone which extends to a specific distance outside the vehicle. In this case, different closure control commands may be generated depending on whether an authorizing authentication element is identified in the interior of the vehicle or outside the vehicle. However, for the purposes of this document, only the behavior of the closure system on identification of an authentication element outside the vehicle is of interest.

In the example under consideration, the five identification sensors on the four vehicle doors 2 to 5 and on the tailgate 6 define five associated external detection zones 7, 8, 9, 10, 11, which essentially do not overlap. In the schematic illustration in the figure, the freedom from overlaps is indicated by four separating strips 12, 13, 14, 15, marked in black. An area 16 in front of the vehicle 1, likewise marked in black also remains insensitive to any authentication elements located there.

Characteristically, each external detection zone 7 to 11 is split into an inner range zone 7*a* to 11*a*, relatively close to the vehicle, and an outer range zone 7*b* to 11*b*, relatively far away from the vehicle. The inner and outer range zones overlap in the boundary area, so that there are no undesirable dead zones, and form a respective hysteresis transitional area 7*c* to 11*c*.

Matched to this, an authentication element range sensor system is provided in the closure control means, which always determines the range of an identified authentication element from the vehicle 1 provided that the closure control means can determine whether the authentication element detected in its associated external detection zone by one of the identification sensors is located in the inner or the outer range zone. The range sensor system may be of any desired conventional type for this purpose, and therefore does not need to be described in any more detail here.

When an authorizing authentication element is present, the closure control means produce closure control commands, based inter alia on whether the identified authentication element is located in one of the inner range zones 7*a* to 11*a* or one of the outer range zones 7*b* to 11*b*. The closure control commands are in this case preferably themselves the locking and unlocking control commands required to switch the relevant closure unit between its locked state and its unlocked state, and are not merely enable or inhibit signals for enabling or inhibiting, respectively, such a switching to the locked or unlocked state. In other words, when an authorizing authentication element is identified, the closure control means are automatically able to cause one or more or all of the closure units to be locked or unlocked, without the user's needing to operate a control element relating to this for this purpose.

To identify an authentication element, determine its range and check its authorization, preferably the closure control means initially cyclically transmits an interrogating carrier signal via the identification sensors, likewise cyclically waking (activating) the respective authentication element. If an authentication element that has been awakened is located in the detection area covered by the carrier signal from one of the identification sensors, it receives the carrier signal and returns a response signal, which the closure control means uses to identify that an authentication element is present, and in which of the external detection zones 7 to 11 it is situated in. Then, by means of its range sensor system, the closure control means determines whether the authentication element is located in the relevant inner range zone 7*a* to 11*a*, or outer range zone 7*b* to 11*b*. At the same time, it uses authentication communication to check the authorization of the authentication element for the particular vehicle 1. If the authentication element is identified as being authorized, the closure control means produces that locking or unlocking closure control command which is associated with the range zone in which the authorizing authentication element has been identified.

The closure control logic (that is, the determination of the correct closure control command based on the present closure state of the closure units and the external range zone in which an authorizing authentication element has been identified) can be selected variably, and matched to the respective application. One closure logic example is described below, and is representative of other implementation options.

In this example, it is assumed that the inner range zones 7*a* to 11*a* adjacent to the vehicle access elements are associated with the production of unlocking commands, and the outer range zones 7*b* to 11*b* are associated with the production of locking commands. That is, one or more closure units are unlocked on identification of an authorizing authentication element in an inner range zone, and one or more closure units are locked on identification of an authorizing authentication element in an outer range zone.

In this case, it is preferably envisaged that a locking closure control command will change all the closure units to their locked state, if they are not yet in this state, while, on the other hand, allowing global or selective unlocking for the unlocking process. For global unlocking, all the closure units are changed to their unlocked state when an unlocking closure control command is produced while, in the mode where the respectively produced unlocking command results in selective unlocking, the only closure unit which is changed to its unlocked state is that which is associated with the respective inner range zone in which the authorizing authentication element has been identified. A presetting control element, which is preferably arranged on the respective authentication element, is provided for switching between these two unlocking modes.

Undefined locking and unlocking of closure units in the situation where an authorizing authentication element is located in the boundary area 7*c* to 11*c* between one of the inner range zones 7*a* to 11*a* and one of the outer range zones 7*b* to 11*b* is avoided by providing hysteresis. That is, each inner range zone 7*a* to 11*a* extends outwards from the vehicle beyond the boundary line, facing the vehicle, of the outer range zone 7*b* to 11*b*, and a closure control command is produced only when an authorizing authentication element leaves the hysteresis overlap area 7*c* to 11*c* formed in this way, and not just when it enters this area. In other words, when an authentication element approaches the vehicle from the outside, the closure units remain locked until the authorizing authentication element has left the respective hysteresis overlap area 7*c* to 11*c* towards the vehicle (that is, has completely left the outer range zone 7*b* to 11*b*, towards the vehicle). Analogously, when an authentication element is moving away from the vehicle 1, at least the associated closure unit remains unlocked until the authentication element has left the associated hysteresis overlap area 7*c* to 11*c* away from the vehicle (that is, has completely left the inner range zone 7*a* to 11*a*, away from the vehicle).

Automatic relocking is provided as a further function. This consists in the closure control means automatically switching a closure unit (which has been set to its unlocked state on the basis of an authorizing authentication element having been identified in an inner range zone 7*a* to 11*a*) back to its locked state after a waiting time which can be predetermined, if no authorizing authentication element is any longer present in the inner range zone and the relevant access element has not been opened during the waiting time.

It is apparent that, apart from the exemplary embodiment described above, further implementations of the closure system according to the invention are feasible. For example, instead of the described methods of operation with global unlocking and locking and selective unlocking, any given desired association between range zones and closure units may be provided, with said closure units being locked or unlocked when an authorizing authentication element is present in the relevant range zone. It is also apparent the closure system according to the invention can be used not only for securing vehicles, but also any other objects, including stationary objects, in which one or more access elements are secured by closure units which can be locked and unlocked.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electronic closure system, comprising:

a plurality of lockable and unlockable closure control units each associated with a different opening element of an object to be secured; and at least one authentication element which can be carried by a user; wherein;

each respective closure control unit has at least one authentication element identification sensor which is arranged on the object and has a predetermined detection area outside the object, for producing differing closure control commands related to locking and/or unlocking of the said respective closure control unit, based on an external detection range of said detection area in which an authentication element is detected;

external detection zones of said closure control units do not overlap, being separated by areas that are insensitive to any authentication element located there;

each closure control unit includes an authentication element range sensor system for determining whether an authentication element identified in a particular external detection area is located in a range of the particular external detection area relatively closer to the object, or in a range relatively farther away from the object;

each closure control unit automatically produces differing closure control commands for the closure unit upon identification of an authorizing authentication element, based on whether the identified authentication element is located in the range relatively closer to the object or relatively farther away from the object;

in a particular detection area, the range relatively farther away from the object overlaps the range relatively closer to the object in a transitional area whereby hysteresis of the closure control command production process is provided; and each closure control unit produces a closure control command only when an authorizing authentication element has crossed into the inner range or the outer range from the overlap area, and does not produce a closure control command when the authorizing identification element enters the inner range or the outer range other than from the overlap area.

2. The electronic closure system according to claim 1, wherein the closure control unit has at least two selectable modes in which, on identifying an authorizing authentication element in an external detection zone, the closure control unit produces closure control commands for different sets of closure units which are influenced by said commands.

3. The electronic closure system, according to claim 1, wherein on identification of an authorizing authentication element in a range zone relatively closer to the object, the closure control unit produces a closure control command related to unlocking, and on identification of an authorizing authentication element in a range zone relatively farther away from the object, the closure control unit produces a closure control command related to locking.

4. The electronic closure system, according to claim 2, wherein: on identification of an authorizing authentication element in a range zone relatively closer to the object, the closure control unit produces a closure control command related to unlocking, and on identification of an authorizing authentication element in a range zone relatively farther away from the object, the closure control unit produces a closure control command related to locking.

5. The electronic closure system, according to claim 1, wherein the closure control commands related to locking and unlocking represent locking and unlocking commands which change the respective closure unit to its locked or unlocked state.

6. The electronic closure system, according to claim 2, wherein the closure control commands related to locking and unlocking represent locking and unlocking commands which change the respective closure unit to its locked or unlocked state.

7. The electronic closure system, according to claim 3, wherein the closure control commands related to locking and unlocking represent locking and unlocking commands which change the respective closure unit to its locked or unlocked state.

8. The electronic closure system, according to claim 4, wherein the closure control commands related to locking and unlocking represent locking and unlocking commands which change the respective closure unit to its locked or unlocked state.

9. The electronic closure system, according to claim 1, wherein the closure control unit comprises automatic relocking means which, following production of a closure control command related to unlocking, has passed, automatically produces a closure control command related to locking if, following expiration of a predeterminable waiting time, the access element which contains the relevant closure unit of the object has not carried out an opening process, and no authorizing authentication element is any longer located in the relevant external detection zone.

10. The electronic closure system, according to claim 5, wherein the closure control unit comprises automatic relocking means which, following production of a closure control command related to unlocking, has passed, automatically produces a closure control command related to locking if, following expiration of a predeterminable waiting time, the access element which contains the relevant closure unit of the object has not carried out an opening process, and no authorizing authentication element is any longer located in the relevant external detection zone.

11. The electronic closure system, according to claim 6, wherein the closure control unit comprises automatic relocking means which, following production of a closure control command related to unlocking, has passed, automatically produces a closure control command related to locking if, following expiration of a predeterminable waiting time, the access element which contains the relevant closure unit of the object has not carried out an opening process, and no authorizing authentication element is any longer located in the relevant external detection zone.

12. The electronic closure system, according to claim 7, wherein the closure control unit comprises automatic relocking means which, following production of a closure control command related to unlocking, has passed, automatically produces a closure control command related to locking if, following expiration of a predeterminable waiting time, the access element which contains the relevant closure unit of the object has not carried out an opening process, and no authorizing authentication element is any longer located in the relevant external detection zone.

13. The electronic closure system, according to claim 8, wherein the closure control unit comprises automatic relocking means which, following production of a closure control command related to unlocking, has passed, automatically produces a closure control command related to locking if, following expiration of a predeterminable waiting time, the access element which contains the relevant closure unit of the object has not carried out an opening process, and no authorizing authentication element is any longer located in the relevant external detection zone.

14. Apparatus for controlling a closure system for an object having a plurality of lockable and unlockable closure members, comprising:

a plurality of proximity sensors arranged on the object and each having a preset detection area;

at least one authentication element which can be carried by a vehicle user; and a plurality closure control units for controlling locking and unlocking of each of said closure members in response to detection of said at least one authentication element within a detection area of a proximity sensors associated therewith, detection areas of each of said closure control units being separated from one another by areas that are insensitive to any authentication element situated therein; wherein said proximity sensors include means for determining a range to said at least one authentication element;

a closure control unit generates a first control signal for controlling at least one of said closure members in a first mode in response to detection of said authentication element within a first, relatively closer detection range by at least one proximity sensor, and generates a second control signal, for controlling at least one of said closure members in a second control mode, different from said first control mode, in response to detection of said authentication element within a second, relatively more distant detection range;

said first detection range overlaps said second detection range in a transitional area; and each closure control unit generates a control signal only when said authentication element has crossed into the first range or the second range from the transitional area, and does not generate a control signal when said authentication element enters the first range or the second range other than from the transitional area.

15. A method for controlling a closure system for an object having a plurality of lockable and unlockable closure members, a plurality of proximity sensors arranged on the object and each having a preset detection area, at least one authentication element which can be carried by a vehicle user, and a plurality of closure control units for controlling locking and unlocking of respective closure members in response to detection of said at least one authentication element within respective detection areas of said proximity sensors; said method comprising:

said proximity sensors determining a range to said at least one authentication element;

a particular closure control unit generating a first control signal for controlling at least one of said closure members in a first mode in response to detection of said authentication element within a first, relatively closer detection range by at least one proximity sensor; and said particular closure control unit generating a second control signal, for controlling at least one of said closure members in a second control mode, different from said first control mode, in response to detection of said authentication element within a second, relatively more distant detection range; wherein said first detection range overlaps said second detection range in a transition area; and said particular closure control unit generates a control signal only when said authentication element has crossed into the first range or the second range from the transitional area, and does not generate a control signal when said authentication element enters the first range or the second range other than from the transitional area.

16. A method for operating an electronic closure system that includes a plurality of lockable and unlockable closure control units, each associated with a different opening element of an object that is to be secured, and at least one authentication element that can be carried by a user of the object, said method comprising:

providing each respective closure control unit with at least one authentication element identification sensor which is arranged on the object and has a predetermined detection area outside the object, for producing differing closure control commands relating to locking and/or unlocking of the said respective closure control unit, based on an external detection range of said detection area in which an authentication element is detected; wherein, external detection zones of said closure control unites do not overlap, being separated by areas that are insensitive to any authentication element located there;

each closure control unit includes an authentication element range sensor system for determining whether an authentication element identified in a particular external detection area is located in a range of the particular external detection area relatively closer to the object, or in a range relatively farther away from the object;

each closure control unit automatically produces differing closure control commands for the closure unit upon identification of an authorizing authentication element, based on whether the identified authentication element is located in the range relatively closer to the object or relatively farther away from the object;

in a particular detection area, the range relatively farther away from the object overlaps the range relatively closer to the object in a transitional area whereby hysteresis of the closure control command production process is provided; and each closure control unit produces a closure control command only when an authorizing authentication element has crossed into the inner range or the outer range from the overlap area, and does not produce a closure control command when the authorizing identification element enters the inner range or the outer range other than from the overlap area.

* * * * *